(12) United States Patent
Snider et al.

(10) Patent No.: US 11,274,065 B2
(45) Date of Patent: Mar. 15, 2022

(54) CERAMIC FELT MATERIAL FOR HIGH-TEMPERATURE FUEL CELLS

(71) Applicant: FuelCell Energy, Inc., Danbury, CT (US)

(72) Inventors: Matthew T. Snider, Danbury, CT (US); Chao-yi Yuh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 16/007,840

(22) Filed: Jun. 13, 2018

(65) Prior Publication Data

US 2019/0382314 A1    Dec. 19, 2019

(51) Int. Cl.

| | |
|---|---|
| *C04B 35/48* | (2006.01) |
| *C04B 35/64* | (2006.01) |
| *C04B 35/638* | (2006.01) |
| *H01M 8/0282* | (2016.01) |
| *C04B 35/622* | (2006.01) |

(Continued)

(52) U.S. Cl.
CPC .......... *C04B 35/48* (2013.01); *C04B 35/6225* (2013.01); *C04B 35/62655* (2013.01); *C04B 35/62886* (2013.01); *C04B 35/638* (2013.01); *C04B 35/64* (2013.01); *H01M 8/0282* (2013.01); *C04B 2235/3246* (2013.01); *C04B 2235/6028* (2013.01); *C04B 2235/616* (2013.01); *C04B 2235/6567* (2013.01); *C04B 2235/762* (2013.01); *C04B 2235/94* (2013.01); *H01M 2008/147* (2013.01)

(58) Field of Classification Search
CPC ................ C04B 35/48; C04B 35/6225; C04B 35/62655; C04B 35/62886; C04B 35/638; C04B 35/64; C04B 2235/3246; C04B 2235/6028; C04B 2235/616; C04B 2235/6567; C04B 2235/762; C04B 2235/94; H01M 8/0282; H01M 2008/147
See application file for complete search history.

(56) References Cited

U.S. PATENT DOCUMENTS

| | | | | |
|---|---|---|---|---|
| 2,910,371 | A | * | 10/1959 | Ryschkewitsch ....... C04B 35/46 501/104 |
| 3,663,182 | A | * | 5/1972 | Hamling ........... C04B 35/62231 442/181 |

(Continued)

FOREIGN PATENT DOCUMENTS

| | | | |
|---|---|---|---|
| CA | 1010314 A1 * | 5/1977 | |
| WO | WO-9312264 A1 * | 6/1993 | ............. C23C 14/08 |

OTHER PUBLICATIONS

"Zirconyl Chloride." Zirconyl Chloride—Wikipedia, the Free Encyclopedia, Jun. 7, 2015, web.archive.org/web/20150607070410/https://en.wikipedia.org/wiki/Zirconyl_chloride. (Year: 2015).*

(Continued)

*Primary Examiner* — Kelly M Gambetta
*Assistant Examiner* — Andrés E. Behrens, Jr.
(74) *Attorney, Agent, or Firm* — Foley & Lardner LLP

(57) ABSTRACT

An inorganic felt material includes zirconia stabilized by at least one Group IIA material, such that the Group IIA material includes at least one of calcium (Ca), magnesium (Mg), or a combination thereof. The felt material may also include at least one Group III material.

12 Claims, 1 Drawing Sheet

(51) Int. Cl.
*C04B 35/628* (2006.01)
*C04B 35/626* (2006.01)
*C04B 35/00* (2006.01)
*C04B 35/76* (2006.01)
*H01M 8/14* (2006.01)

(56) References Cited

U.S. PATENT DOCUMENTS

| | | | | |
|---|---|---|---|---|
| 3,736,160 | A * | 5/1973 | Hamling | C04B 35/46 501/103 |
| 3,793,041 | A * | 2/1974 | Sowman | C04B 35/6225 501/103 |
| 3,860,529 | A * | 1/1975 | Hamling | C01G 25/02 252/625 |
| 3,950,478 | A | 4/1976 | Kenworthy et al. | |
| 4,259,112 | A * | 3/1981 | Dolowy, Jr | C22C 47/14 419/24 |
| 4,345,955 | A * | 8/1982 | Bakermans | C04B 35/632 156/89.14 |
| 4,797,378 | A | 1/1989 | Sowman | |
| 4,937,212 | A * | 6/1990 | Funkenbusch | C04B 35/6225 501/102 |
| 5,017,316 | A | 5/1991 | Sowman | |
| 5,110,692 | A | 5/1992 | Farooque et al. | |
| 5,250,243 | A * | 10/1993 | Allaire | C04B 35/80 264/344 |
| 6,964,825 | B2 | 11/2005 | Farooque et al. | |
| 8,088,697 | B2 | 1/2012 | Yuh et al. | |
| 9,005,837 | B2 | 4/2015 | Jian et al. | |

OTHER PUBLICATIONS

"Yttrium(III) Chloride." Yttrium(III) Chloride—Wikipedia, the Free Encyclopedia, Nov. 11, 2014, web.archive.org/web/20141111002324/http://en.wikipedia.org/wiki/Yttrium(III)_chloride. (Year: 2014).*

WO-9312264, Method for Preparing a Target Element for Cathode Sputtering. (Campet) Dec. 1991 (online machine translation), [Retrieved on Oct. 12, 2019]. Retrieved from: Google Patents (Year: 1991).*

* cited by examiner

CERAMIC FELT MATERIAL FOR HIGH-TEMPERATURE FUEL CELLS

BACKGROUND

The present application relates to a ceramic felt material for high-temperature fuel cells. More specifically, the present application relates to inorganic felt materials for sealing gaskets in molten carbonate fuel cell manifolds.

Metal external manifolds are a component of molten carbonate fuel cells (MCFCs) and are positioned over the faces of a MCFC stack in order to separately contain the fuel, oxidant, and exhaust atmospheres. As a result, the manifolds must be manufactured and installed to be leak resistant and electrically isolated from other components of the MCFC stack to prevent electrical shorting throughout all phases of the MCFC operation (i.e. stack conditioning, thermal cycling, etc.) at temperatures exceeding 600° C. One means to achieve leak resistance and electrical isolation has been to include a gasket between the MCFC stack and manifold; the gasket is pressurized to form a seal. However, because gaskets are designed as continuous structures from cell-to-cell along the vertical faces of the MCFC stack, and also because gaskets may contact molten electrolyte at each cell, conventional gaskets often experience significant voltage-driven migration of the electrolyte along the gasket which results in removal of electrolyte from one end of the stack and a flooding of electrolyte at the opposite end. Furthermore, over time, the MCFC may undergo shifts in manifold position or shape and/or changes in the vertical profile of the MCFC stack, either of which may dislodge or create gaps in the gasket seal due to weakness and lack of elasticity of the gasket material.

Previous efforts to improve gasket performance have included specialized heat treatments to promote cross-linking between fibers of the inorganic felt, designing gaskets having multiple felt layers and various material compositions, etc. However, these efforts suffered from difficulty of practical implementation in manufacturing or scarcity of materials and end-products or methods of fabrication were not adequate to achieve the required strength and electrolyte migration resistance properties in corrosive operating conditions to serve as sealing gaskets for molten carbonate fuel cells.

It would be advantageous to provide an improved inorganic felt material for sealing gaskets in MCFCs that overcomes the foregoing challenges. These and other advantageous features will be apparent to those reviewing the present disclosure.

SUMMARY

An exemplary embodiment relates to an inorganic felt material comprising zirconia stabilized by at least one Group IIA material.

In one implementation, the Group IIA material includes at least one of calcium (Ca), magnesium (Mg), or a combination thereof.

In one implementation, the Group IIA material is present in a concentration of 2 mol % to 15 mol %.

In one implementation, the Group IIA material includes a Ca material.

In one implementation, the Ca material is present in a concentration of at most 5 mol %.

In one implementation, the Group IIA material further includes a Mg material.

In one implementation, the Mg material is present in a concentration of at most 10 mol %. In another implementation, the Mg material is present in a concentration of at most 6 mol %.

In one implementation, the zirconia is further stabilized by at least one Group III material.

In one implementation, the Group III material includes a yttrium (Y) material.

In one implementation, the zirconia is a cubic crystal structure.

In one implementation, the inorganic felt material has a molar concentration of zirconia of at least 80%.

In one implementation, the inorganic felt material is selected from the group consisting of: 20 mol % Y; 10 mol % Y, 4 mol % Ca, and 2 mol % Mg; 8 mol % Y, 4 mol % Ca, and 4 mol % Mg; 8 mol % Y and 8 mol % Mg; and 3 mol % Ca and 10 mol % Mg.

Another exemplary embodiment relates to a method for fabricating an inorganic felt material comprising: (a) saturating an organic felt material with an inorganic salt solution having a zirconium-based compound and at least one alkaline earth metal-based compound; (b) removing excess inorganic salt solution; (c) drying the organic felt material to form a structure comprising at least one zirconium-based inorganic layer over the organic felt material; (d) heat-treating the structure to remove the organic felt material and form a zirconia felt layer; (e) repeating (a)-(d) a plurality of times to form a plurality of zirconia felt layers; (f) stacking the plurality of zirconia felt layers to a predetermined thickness; and (g) sintering the plurality of zirconia felt layers to form the inorganic felt material.

In one implementation, the zirconium-based compound is zirconyl chloride octahydrate or zirconium tetrachloride.

In one implementation, the at least one alkaline earth metal-based compound is calcium carbonate, magnesium oxide, or a combination thereof.

In one implementation, the inorganic salt solution further comprises yttrium chloride hexahydrate.

In one implementation, the drying occurs at a temperature in the range of 50° C. to 150° C. and for a time in the range of 0.5 hrs to 1.5 hrs.

In one implementation, the heat-treating occurs at a temperature in the range of 50° C. to 150° C. and for a time in the range of 24 hrs to 72 hrs.

In one implementation, the stacking occurs at a temperature in the range of 800° C. to 1200° C.

In one implementation, the sintering occurs at a temperature in the range of 1500° C. to 1625° C.

In one implementation, the method further comprises cooling the inorganic felt material at a temperature in the range of 900° C. to 1100° C. and for a time in the range of 1.0 hrs to 10 hrs.

DETAILED DESCRIPTION

Figure 1:
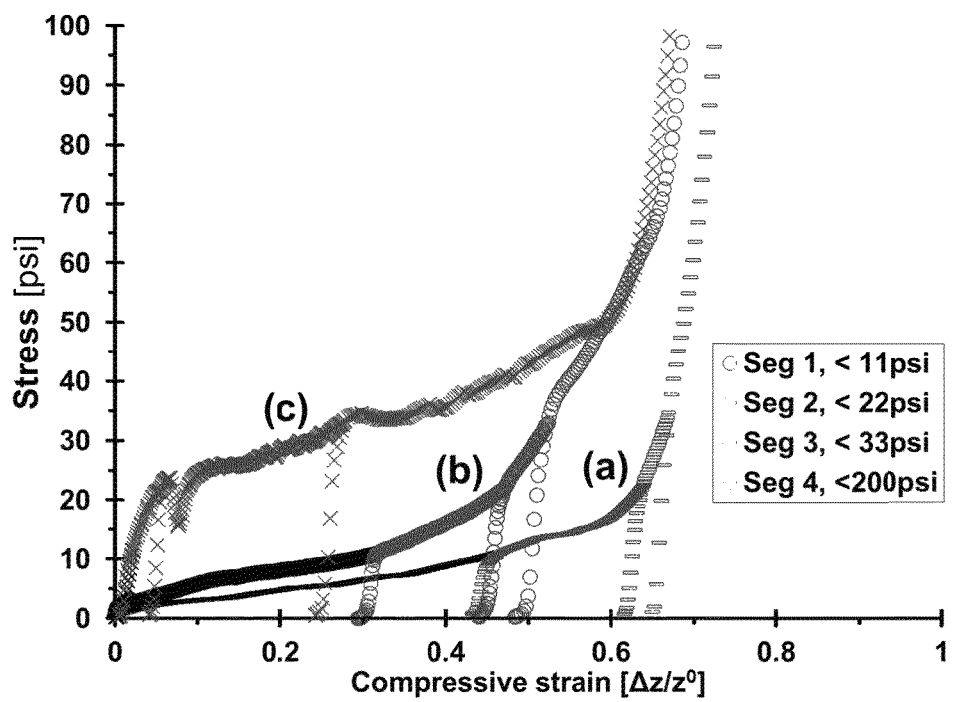
FIG. 1 is a set of stress-strain curves on (a) a pure ceria felt, (b) a $Zr_{0.84}Y_{0.1}Ca_{0.04}Mg_{0.02}O_{1.89-\delta}$ (10:4:2) felt, and (c) a $Zr_{0.87}Ca_{0.03}Mg_{0.10}O_{1.87-\delta}$ (0:3:10) felt measured at 650° C. with 5 wt % molten alkali carbonate loading.

The present disclosure describes a zirconia felt with a range of alkaline earth metal stabilizers heat-treated to yield an optimal fiber microstructure for maintaining strength and elasticity of a sealing gasket operating in conditions where a molten carbonate electrolyte is present over long time scales. The inorganic felt materials described herein are capable of operating at temperatures exceeding 600° C. in oxidizing, corrosive, and other chemically harsh environments for long periods of time without causing electric shorts and losing strength and/or elasticity.

In one exemplary embodiment, a method for fabricating an inorganic felt material includes saturating an organic felt material with an inorganic salt solution having a zirconium-based compound and at least one alkaline earth metal-based compound. The organic felt may be a polymer fiber template over which inorganic felt layers are constructed. In one example, the zirconium-based compound may be zirconyl chloride octahydrate or zirconium tetrachloride. Zirconyl chlorides are effective zirconium precursors in forming zirconia felts because they are acidic enough to dissolve alkaline earth metal precursors (i.e. magnesium and calcium precursors) such that more expensive nitrates, chlorides, or acetates of Mg and/or Ca are not necessary. In one example, a 2.5 M concentration of inorganic salts in water solution is utilized. In one example, the alkaline earth metal-based compound may be calcium carbonate, magnesium oxide, or a combination thereof. In one example, the molar concentrations of the inorganic salts in solution include 87% zirconyl chloride, 3% calcium carbonate, and 10% magnesium oxide. In another example, the inorganic salt solution may also include a yttrium- or scandium-based compound. In one example, the molar concentrations of the inorganic salts in solution include 84% zirconyl chloride octahydrate, 8-10% yttrium chloride hexahydrate, 4% calcium carbonate, and 2-4% magnesium oxide.

Other potential stabilizers include aluminum (Al), cerium (Ce), and other combinations of Group IIA and Group III elements. Traditionally, Group III elements have been used as stabilizers for zirconia felts. The present disclosure identifies Group IIA elements or combinations of Group IIA and Group III elements as stabilizers which enhance the performance of inorganic felt materials in operating conditions where molten carbonate electrolyte is present by increasing felt strength and elasticity. The use of Group IIA elements, either alone or in combination with Group III elements, have benefits over using only Group III stabilizers. For example, alkaline earth elements (i.e. Mg, Ca, etc.) are cheaper and easier to acquire than scandium, yttrium, or the rare-earth elements. Secondly, Group IIA elements (i.e. Mg, Ca) are lighter than their rare earth counterparts and the felts produced as a result, also tend to weigh less. Lighter felts are cheaper because they are conventionally sold on a per-weight basis.

In some implementations, the organic felt material may be heated during impregnation to achieve a desired ratio of stabilizers to zirconia. In some examples, the organic felt material is heated to a temperature above room temperature (approximately 23° C.) up to a temperature of 70° C. For example, the organic felt material may be heated to a temperature from 50° C. to 70° C. Experimentally, it was found that heating the organic felt material to room temperature or a temperature below room temperature resulted in an incorrect molecular formulation in the final product. In addition, heating the organic felt material to a temperature above 70° C. caused the organic felt to begin to break apart in the presence of the highly acidic impregnation solution, resulting in a weak and chalky felt.

After the organic felt material is impregnated with inorganic salts from the concentrated inorganic precursor salt solution, excess solution is removed by press or centrifuge and the resulting organic felt material is dried to form a structure comprising at least one zirconium-based inorganic layer over the organic felt material. In one example, the drying occurs at a temperature in the range of 50° C. to 150° C. for a time in the range of 0.5 hrs to 1.5 hrs. In one example, the organic felt material is dried at a temperature in the range of 85° C. to 115° C. for approximately 1 hr to discourage the development of concentration gradients. After drying, the structure is heat-treated to separate and remove the organic felt material from the at least one zirconium-based inorganic layer to form a zirconia felt layer in an organic burnout. In one example, the heat-treating occurs at a temperature in the range of 50° C. to 150° C. for a time in the range of 24 hrs to 72 hrs in ambient atmosphere to prevent warping. In one example, the heat-treating occurs at a temperature in the range of 85° C. to 115° C. The resulting zirconia felt layer may be composed of oxide fibers with similar size and shape to the polymer fiber template.

After completion of the heat-treating, a plurality of zirconia felt layers formed from the above-described processing steps are stacked to a predetermined thickness (accounting for shrinkage) and at a temperature in the range of 800° C. to 1200° C. In a final heat treatment, the plurality of zirconia felt layers are sintered at temperatures exceeding 1500° C. In one example, the plurality of zirconia felt layers are sintered at a temperature in the range of 1500° C. to 1625° C., to form the inorganic felt material having the desired microstructure. The inorganic felt material is then cooled at a temperature just below the eutectic temperature of the inorganic felt material in the range of 900° C. to 1100° C. for a time in the range of 1.0 hrs to 10 hrs to encourage phase separation. Phase separation encourages increased strength and elasticity of the zirconia fiber as long as secondary phase particles are small, uniformly distributed, and dominantly confined to the bulk. The final heat treatment is conducted at temperatures sufficiently high to achieve a smooth fiber surface while strength and elasticity may also be improved by holding at mid-range temperatures (900-1100° C.) on cooldown.

Crystal structures of the resultant inorganic felt fiber matrix prepared in accordance with the above-described method is a cubic crystal structure (i.e. a "fully" stabilized zirconia) to achieve a smooth, less-wettable fiber surface. Moreover, in one exemplary embodiment, the zirconia molar concentration of the inorganic felt material is in the range of 80% to 87%. If the zirconia concentration is above 87%, zirconia is less likely to be in the fully stabilized cubic phase. If the zirconia concentration is below 80%, the inorganic felt will be weaker due to the stabilizer leaching from the fiber in the presence of molten carbonate. It is critical that the amount of stabilizer (i.e. cations other than zirconium) is enough to fully stabilize the zirconia in the cubic phase rather than the tetragonal or monoclinic phases. Tetragonal and monoclinic zirconia exhibits high electrolyte pickup and migration, and is ineffective as a sealing gasket material as a result of electrolyte migration in the presence of molten carbonate. Tetragonal and monoclinic zirconia gaskets may be used in locations that do not come into contact with the electrolyte (e.g., an endplate or a back side of an alumina dielectric).

In other examples, zirconia felts may be fabricated by weaving inorganic fibers pre-fabricated by drawing, spinning, sol-gel, etc.

As a whole, inorganic felt materials may be enhanced with stabilizers (either Group IIA, Group III, or a combination thereof) at an optimal concentration range, regardless of which type of stabilizer is used. In one implementation, the inorganic felt material impregnated with the stabilizers may include at least two of yttrium (Group III), calcium (Group IIA), and magnesium (Group IIA), with the balance being zirconium, at least according to the relationship of equations (1) to (3), which must be simultaneously satisfied:

$$16 \leq x+2y+z \leq 20 \quad (1)$$

$$8 \leq x/2+y+z \leq 13 \quad (2)$$

$$y \leq 5 \quad (3)$$

where x=mol % yttrium, y=mol % calcium, and z=mol % magnesium. Table 1 below describes the mechanical and electrolyte wettability properties of zirconia felt material as a function of its composition, which includes varying concentrations of yttrium (Y), calcium (Ca), and magnesium (Mg). For example, zirconia felt materials having the following predetermined concentrations of Y, Ca, and Mg were tested: (A) pure ceria ($ZrO_2$; 0 mol % Y, 0 mol % Ca, and 0 mol % Mg); (B) 20 mol % Y, 0 mol % Ca, and 0 mol % Mg; (C) 10 mol % Y, 4 mol % Ca, and 2 mol % Mg; (D) 8 mol % Y, 4 mol % Ca, and 4 mol % Mg; (E) 8 mol % Y, 0 mol % Ca, and 8 mol % Mg; (F) 0 mol % Y, 3 mol % Ca, and 10 mol % Mg; and (G) 0 mol % Y, 0 mol % Ca, and 13 mol % Mg.

TABLE 1

| Material: $ZrO_2$ + mol % Y:Ca:Mg | % Compression at 22 psi | | % Springback at 22 psi | | Wt % Li/Na carbonate pickup, 100 hrs @650° C. | x + 2y + z | x/2 + y + z |
|---|---|---|---|---|---|---|---|
| (x:y:z) | 4 hr | 100 hr | 4 hr | 100 hr | 100 hr | | |
| Ceria | 64 | 74 | 4 | 1 | 0.4 | N/A | N/A |
| 20:0:0 | 67 | 55 | 2 | 2 | 0.5 | 20 | 10 |
| 10:4:2 | 47 | 72 | 7 | 1 | 0.5 | 20 | 11 |
| 8:4:4 | 45 | 50 | 9 | 2 | 0.2 | 20 | 12 |
| 8:0:8 | 30 | 42 | 5 | 15 | 2.0 | 16 | 12 |
| 0:3:10 | 5.7 | 14 | 27 | 19 | 1.5 | 16 | 13 |
| 0:0:13 | 6.8 | 5.3 | 44 | 39 | 16 | 13 | 13 |

Strength data and carbonate pickup test (molten carbonate absorption) results are tabulated in Table 1. For the absorption tests, each felt sample was compacted as it would be in a MCFC generator, and pressed between porous MCFC cathode materials pre-loaded with carbonate. After 100 hrs at 650° C., the felts were acid-washed, and the composition of the wash was measured to determine the amount of carbonate absorbed by the felt. Sample G (0:0:13) picked up the most carbonate (16 wt %), while sample D (8:4:4) picked up the least (0.2 wt %). In order to resist migration of liquid such as molten carbonate, it is critical that the fibers of an inorganic felt have smooth, relatively non-wettable inert surfaces. Moreover, samples F and G exhibited by far the smallest percent compression (smaller compression indicates a greater measure of strength) and highest percent springback (higher springback indicates a greater measure of elasticity).

In general, samples B to F satisfy equations (1) to (3), meaning that the resultant felt retains sufficient strength and elasticity at high temperature, in the presence of corrosive liquids or vapors over long time-scales, and permits little liquid absorption to minimize voltage-induced electrolyte migration through the material. Sample B utilizes only yttrium stabilizer (i.e., x>0 and y+z=0); while samples C to F had varying concentrations of yttrium (0 mol % to 10 mol %), calcium (0 mol % to 4 mol %), and magnesium (2 mol % to 10 mol %). Felts having lower than about 16 mol % stabilizer were determined to inadequately sinter while felts above about 20 mol % stabilizer were determined to have low density and strength. Thus, the present disclosure describes felt materials having adequate mechanical properties using only a Group III stabilizer. However, the addition of at least one of Ca and Mg (Group IIA elements) to a formulation including Y (i.e., samples C to E) significantly improves mechanical properties. As seen in Table 1 above, samples C to E experience significantly less compression than sample B after 4 hours, with samples D and E showing less compression than sample B even after 100 hours. Each of samples C to E also exhibit moderately greater springback than sample B after 4 hours.

Calcium and magnesium, while both Group IIA elements, serve complementary functionalities. For example, Ca may improve material sintering at concentration levels up to 5 mol % Ca, above which the felt experiences a loss of compliance (i.e., increased stiffness). Compliance is a property of materials measuring elastic deformation when subjected to an applied force. Mg additions significantly enhance material strength, though at higher concentrations, (e.g., sample G), the felt material undergoes significantly higher springback and enhanced wt % electrolyte pickup. For example, at concentrations above about 6 mol % Mg, the felt experiences enhanced wt % electrolyte pickup. Comparing samples D and E, both of which have equal amounts of yttrium, replacement of 4 mol % Ca with 4 mol % Mg results in an increase by ten times of Li/Na electrolyte pickup. Similarly with samples F and G, the addition of 3 mol % Mg results in an increase by over ten times of Li/Na electrolyte pickup.

Figure 2:
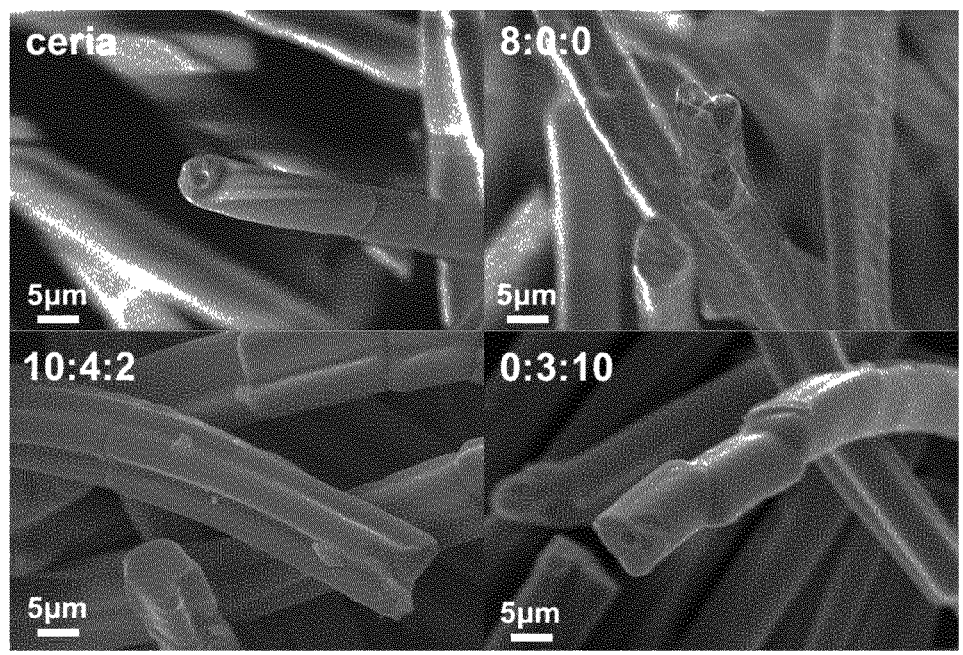
FIG. 2 is a set of scanning electron microscope (SEM) images of a pure ceria felt, a $Zr_{0.84}Y_{0.1}Ca_{0.04}Mg_{0.02}O_{1.89-\delta}$ (10:4:2) felt, and a $Zr_{0.87}Ca_{0.03}Mg_{0.10}O_{1.87-\delta}$ (0:3:10) felt, and a $Zr_{0.92}Y_{0.08}O_{1.96-\delta}$ (8:0:0) felt.

FIGS. 1 and 2 illustrate comparative data of the zirconia felts fabricated by the methods described herein and zirconia felts stabilized with yttria, ceria, or another Group III element. The data of FIGS. 1 and 2 show that materials stabilized with Group III elements lose a significant amount of their strength and elasticity characteristics they had at room temperature when operating at high-temperature, corrosive environment.

For example, FIG. 1 is a set of stress-strain curves on three inorganic felts: (a) sample A, (b) sample C, and (c) sample F measured at 650° C. with 5 wt % molten alkali carbonate loading. Measurements were taken every 0.0002 in of deflection at a rate of 0.25 in/min strain rate. Stresses were temporarily relieved at 11 psi, 22 psi, and 33 psi to determine the amount of "elastic springback" (elasticity) exhibited by each felt. Each of the tested felts performed similarly at room temperature; however, differences in performance were seen when tested at MCFC operating conditions. FIG. 1 illustrates that optimally stabilized zirconia (samples C and F) retains more of its strength than pure ceria (sample A). At operating pressures (200 psi), sample A experiences a greater increase in stress with minor increases in strain. Also at 200 psi, sample F exhibits the best performance, as stress increases at a relatively slower rate (as compared with samples A and C) from about 35 psi to about 50 psi as strain is increased from about 0.3 $\Delta z/z^0$ to 0.6 $\Delta z/z^0$. Sample F includes the greatest amount of magnesium content (10 mol %) than either sample C (2 mol %) or sample A (0 mol %) and this accounts for the slower increase in stress in response to applied strain at 200 psi. As noted above, Mg may significantly enhance material strength.

FIG. 2 is a set of scanning electron microscope (SEM) images of sample A, sample C, sample F, and a $Zr_{0.92}Y_{0.08}O_{1.96-\delta}$ (8:0:0) felt. Segregated phases present sample C and sample F are not visible in the SEM images. The SEM images of FIG. 2 depict felt fibers having smooth fiber surfaces by stabilizing zirconia with an optimal combination of Ca and Mg (i.e. see bottom-left for sample C and bottom-right for sample F). The $Zr_{0.92}Y_{0.08}O_{1.96-\delta}$ (8:0:0) felt is shown to have a rough, scaly outer surface. In comparing the (8:0:0) felt with sample B (see Table 1), the rough and scaly outer surface of the (8:0:0) felt is due to inadequate sintering of the materials since the stabilizer is present in quantity of less than about 16 mol %. Compounding this effect, there is no calcium quantity to help improve material sintering or magnesium to enhance material strength.

Thus, the present disclosure describes inorganic felt materials and methods of fabrication thereof for sealing gaskets in molten carbonate fuel cell manifolds. The inorganic felt material as described herein is composed of zirconia stabilized by a Group IIA element or a combination of a Group IIA element and Group III element (exceeding 16 mol % in combination). Sintering at a temperature above eutectic (in the purely fully-stabilized cubic-phase regime) and cooling at a temperature just below the eutectic promotes fine precipitate formation. As a result, the inorganic felt material retains strength and elasticity at high temperature, in the presence of corrosive liquids or vapors over long timescales, and permits little liquid absorption to minimize voltage-induced electrolyte migration through the material.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the inorganic felt material as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. In some cases, the actions recited herein can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An inorganic felt material for a molten carbonate fuel cell gasket, comprising:
   cubic zirconia stabilized by at least one Group IIA material; wherein:
   the cubic zirconia is present at a concentration of 80-87 mol % in the inorganic felt material;
   yttrium is present at a concentration of at least 8 mol % in the inorganic felt material;
   the at least one Group IIA material comprises calcium, present at a concentration of no greater than 5 mol %, and magnesium, present at a concentration of no greater than 10 mol % in the inorganic felt material; and the concentrations of yttrium, calcium, and magnesium in the inorganic felt material satisfy equations (1), (2), and (3):

$$16 \leq x+2y+z \leq 20 \quad (1)$$

$$8 \leq x/2+y+z \leq 13 \quad (2)$$

$$y \leq 5, \quad (3)$$

wherein x=mol % yttrium, y=mol % calcium, and z=mol % magnesium; and the inorganic felt material exhibits a carbonate uptake rate of 2.0 wt. % or less after 100 hours operation in contact with a molten carbonate electrolyte at 650° C.

2. The inorganic felt material of claim 1, wherein the at least one Group IIA material is present in a concentration of 2 mol % to 15 mol %.

3. The inorganic felt material of claim 1, wherein x, y, and z, respectively, are as follows:

$$x=10; y=4; z=2; \text{ or}$$

$$x=8; y=4; z=4.$$

4. A method for fabricating an inorganic felt material for a molten carbonate fuel cell gasket, comprising:
(a) saturating an organic felt material with an inorganic salt solution comprising 84-87 mol % of a zirconium-based compound, 8-10 mol % of a yttrium-based compound, 3-4 mol % of a calcium-based compound, and 2-10 mol % of a magnesium-based compound, wherein the concentrations of the zirconium-based compound, the yttrium-based compound, the calcium-based compound, and the magnesium-based compound are expressed in terms of mol %, relative to the total moles of inorganic salts present in the inorganic salt solution;
(b) removing excess inorganic salt solution;
(c) drying the organic felt material to form a structure comprising at least one zirconium-based inorganic layer over the organic felt material;
(d) heat-treating the structure to remove the organic felt material and form a zirconia felt layer;
(e) repeating (a)-(d) a plurality of times to form a plurality of zirconia felt layers;
(f) stacking the plurality of zirconia felt layers to a predetermined thickness; and
(g) sintering the plurality of zirconia felt layers at a temperature in the range of 1500° C. to 1625° C. to form the inorganic felt material;
wherein:

the inorganic felt material comprises cubic zirconia stabilized by at least one Group IIA material;
the cubic zirconia is present at a concentration of 80-87 mol % in the inorganic felt material;
yttrium is present at a concentration of at least 8 mol % in the inorganic felt material;
the at least one Group IIA material comprises calcium, present at a concentration of no greater than 5 mol %, and magnesium, present at a concentration of no greater than 10 mol % in the inorganic felt material; and
the concentrations of yttrium, calcium, and magnesium in the inorganic felt material satisfy equations (1), (2), and (3):
(1) $16 \leq x+2y+z \leq 20$
(2) $8 \leq x/2+y+z \leq 13$
(3) $y \leq 5$,
wherein x=mol % yttrium, y=mol % calcium, and z=mol % magnesium; and
the molten carbonate fuel cell gasket exhibits a carbonate uptake rate of 2.0 wt. % or less after 100 hours operation in contact with a molten carbonate electrolyte at 650° C.

5. The method of claim 4, wherein the drying occurs at a temperature in the range of 50° C. to 150° C. and for a time in the range of 0.5 hrs to 1.5 hrs.

6. The method of claim 4, wherein the heat-treating occurs at a temperature in the range of 50° C. to 150° C. and for a time in the range of 24 hrs to 72 hrs.

7. The method of claim 4, wherein the stacking occurs at a temperature in the range of 800° C. to 1200° C.

8. The method of claim 4, further comprising:
cooling the inorganic felt material at a temperature in the range of 900° C. to 1100° C. and for a time in the range of 1.0 hrs to 10 hrs.

9. The method of claim 4, wherein the inorganic salt solution comprises 84 mol % of the zirconium-based compound, 8-10 mol % of the yttrium-based compound, 4 mol % of the calcium-based compound, and 2-4 mol % of the magnesium-based compound.

10. The method of claim 4, wherein x, y, and z, respectively, are as follows:

$$x=10; y=4; z=2; \text{ or}$$

$$x=8; y=4; z=4.$$

11. The method of claim 4, wherein x=8; y=4; and z=4.

12. The method of claim 11, wherein the carbonate uptake rate is 0.2 wt. % or less after 100 hours operation in contact with a molten carbonate electrolyte at 650° C.

* * * * *